Sept. 1, 1942.  F. E. BEST  2,294,359
AIRPLANE WING AND FUSELAGE
Filed July 10, 1939  2 Sheets-Sheet 1

Frank Ellison Best,
INVENTOR.

Sept. 1, 1942.  F. E. BEST  2,294,359

AIRPLANE, WING AND FUSELAGE

Filed July 10, 1939  2 Sheets-Sheet 2

Frank Ellison Best

INVENTOR.

Patented Sept. 1, 1942

2,294,359

UNITED STATES PATENT OFFICE 2,294,359

AIRPLANE WING AND FUSELAGE

Frank Ellison Best, Indianapolis, Ind.

Application July 10, 1939, Serial No. 283,551

8 Claims. (Cl. 244—117)

My invention relates to improvements in an airplane wing and fuselage and process of making same.

In my prior application Serial Number 267,263, filed April 11, 1939, I have disclosed an airplane in which the wings are molded or die cast and have certain shapes calculated to lessen air resistance and provide smoothness of air flow. My invention herein described embodies these features together with certain improvements hereinafter set forth.

An object of this invention is to provide an airplane wing structure which is of unitary contruction from tip to tip.

Another object is to provide a unitary airplane wing structure having a cabin compartment formed within said wing structure.

Another object is to provide an airplane in which the wing structure is made in one unit extending transversely of the airplane and the fuselage is made in two or more units shaped to fit over the wing structure and adapted to be secured to the wing.

Another object is to provide an airplane wing and fuselage construction of this nature in which the lower portion of a cabin is provided in the wing structure and the upper portion of the cabin is provided in the fuselage so that the cabin is completed when the wing structure and fuselage are assembled.

Another object is to provide an airplane which may be molded from transparent plastic material thus rendering all of the parts of said airplane readily visible for inspection and further providing a transparent airplane which is difficult to see when in the air, making it useful for war purposes.

Other objects are to provide for very rapid and inexpensive construction of airplanes and to provide for the manufacture of any desired number of airplanes of substantially identical construction thereby insuring uniformity of operation of said airplanes so that pilots after becoming familiar with the operation of one of said planes will have no trouble in operating other planes of the same type.

Other objects will be apparent from the following descriptoin taken in connection with the accompanying drawings.

In the drawings Figure 1 is a view partly in plan and partly in section, substantially on broken line 1—1 of Fig. 2, of an airplane wing structure constructed in accordance with my invention, parts being broken away.

Like reference numerals designate like parts throughout the several views.

Figure 1:
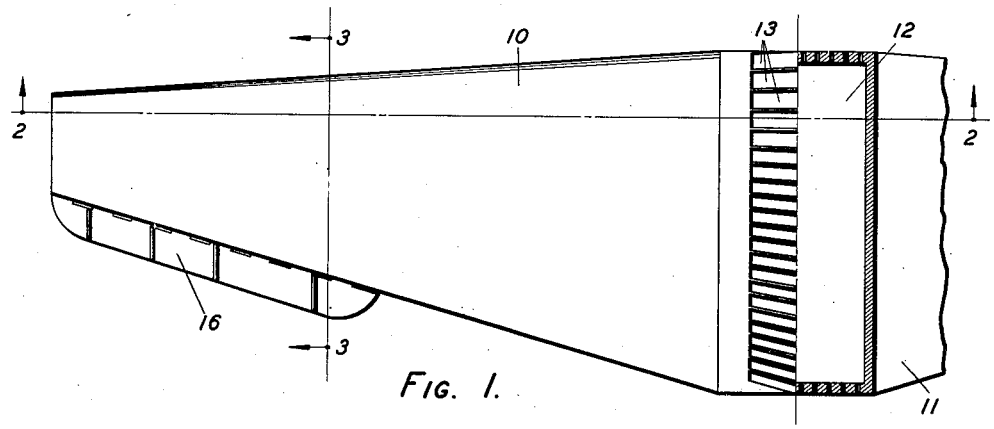
Figure 2:
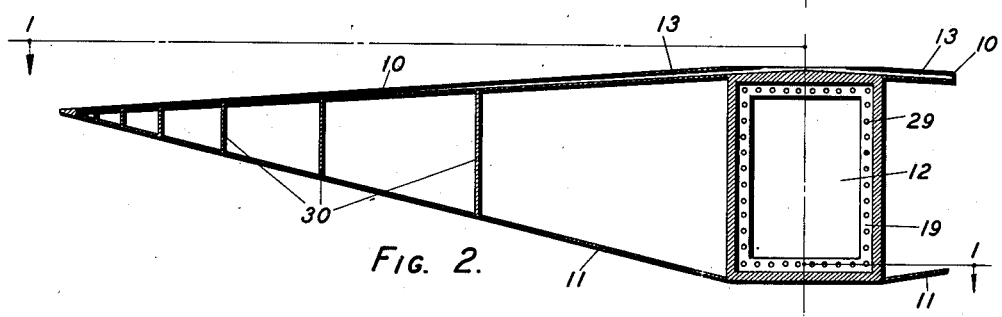
Fig. 2 is a sectional view substantially on broken line 2—2 of Fig. 1.
Figure 3:
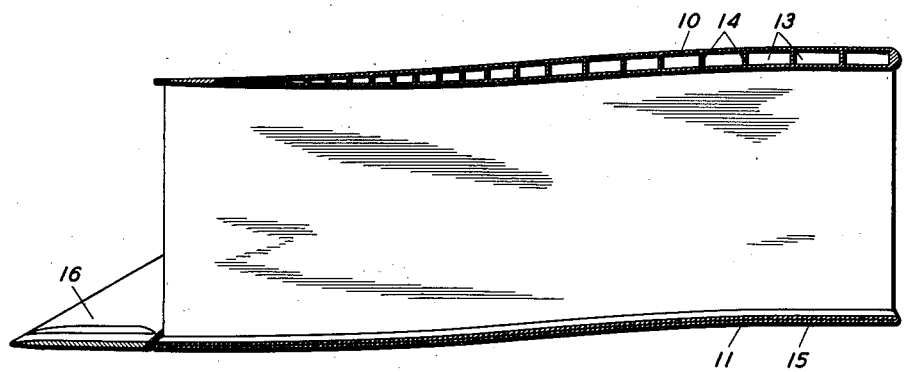
Fig. 3 is a sectional view on a larger scale than Fig. 1 taken substantially on broken line 3—3 of Fig. 1.
Figure 7:
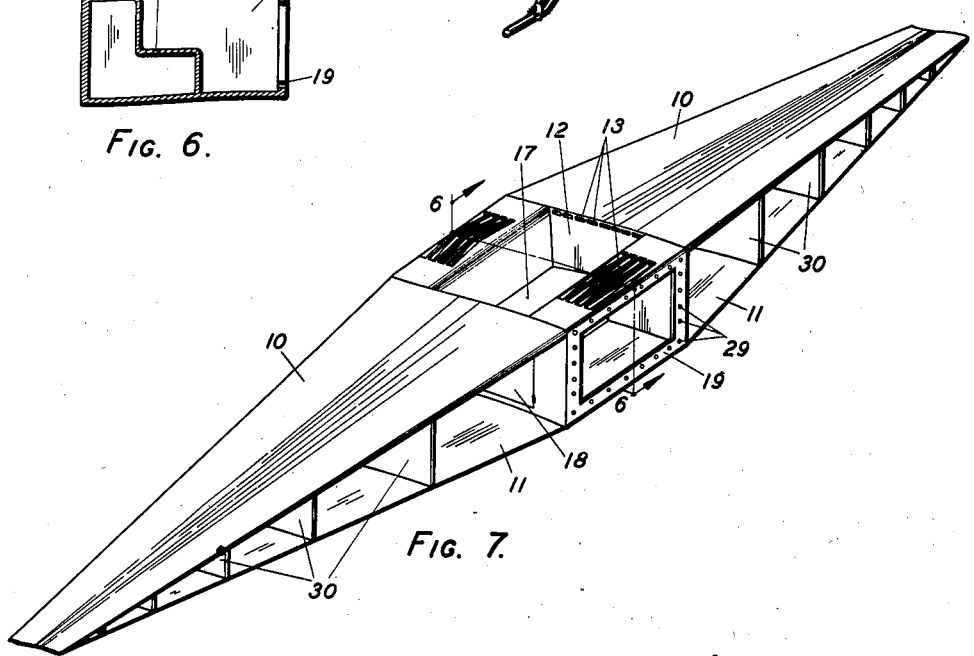
Fig. 7 is a detached perspective view of the wing structure of the airplane shown in Figs. 4 and 5 and showing a different type of cabin compartment from that shown in Figs. 1, 2 and 3.

It is to be noted that the wing structure disclosed in Figs. 1, 2 and 3 discloses a cabin compartment within the wing structure which is closed at the top while Fig. 7 discloses a cabin compartment which is open at the top and cooperates with a portion of the fuselage to form a closed cabin when the wing structure and fuselage are assembled.

Referring to the drawings my wing structure therein shown comprises two upper plane members 10 of duplicate construction and two lower plane members 11, also of duplicate construction. A cabin compartment 12 is provided medially between the two ends or tips of the wing structure. The wing members and cabin portion preferably are all integrally molded and of one piece construction.

The upper plane members 10 extend in opposite directions from the upper part of the cabin compartment 12 and are each inclined downwardly from the horizontal a slight amount to avoid positioning said two plane members in a common plane and to thereby facilitate the drawing of cores from the upper plane members after the wing structure has been molded.

Each upper plane member 10 is of substantial thickness at its inner end where it connects with the cabin compartment 12 and tapers toward its outer end. Each upper plane member 10 has longitudinal openings 13 cored therein, extending from the location of the cabin portion substantially to the outer end thereof.

These openings 13 taper toward the outer end of the plane members 10. Thin upright walls 14 are provided between these openings 13 to give strength to the structure. The openings 13 are formed at the time the wing structure is molded by the use of cores, not shown. These cores are later withdrawn from the inner end portions of the planes. The slight downward incline of the upper planes facilitates the removal of these cores which may be withdrawn by a straight pull.

The forward edges of the upper plane members 10 are of greater thickness than the rear edges thereof, as shown in Fig. 3.

The lower plane members 11 extend outwardly from the lower portion of the cabin compartment 12 and are united at their outer ends with the upper plane members 10. These lower plane members 11 are inclined upwardly toward their outer ends and cooperate with the upper plane members and with the cabin section of the structure to form trusses of generally triangular shape which provide great strength in a wing structure of minimum weight. As the lower planes 11 are the tension members in the trusses they are preferably provided with reinforcing means 15 extending continuously substantially from tip to tip of said planes 11.

Thin upright walls or fins 30 connect the upper and lower plane members 10 and 11 with each other and further strengthen the structure.

The upper and lower planes 10 and 11 preferably are not flat, transversely considered, but are slightly curved or streamlined as best shown in Fig. 3. The transverse streamline curvature provided in these planes is of such shape as to reduce air resistance and eddy currents of air to a minimum. This curvature is shown and described in my copending application hereinbefore referred to.

I show suitable ailerons 16 pivotally connected, in the usual manner, with the lower plane members 11.

In the wing structure disclosed in Fig. 7 I have shown the cabin compartment 12 open at the top and provided with a seat 17. In this wing structure some of the openings 13 in the upper plane members 10 are shown as terminating in the side wall of the cabin compartment 12 providing entrance and exit for said compartment from between the upper and lower planes.

Figure 4:
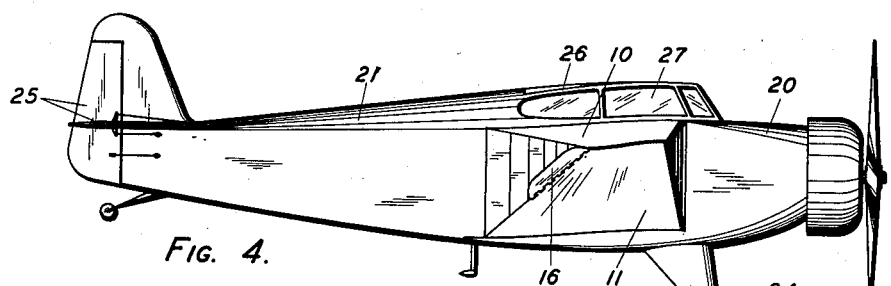
Fig. 4 is a side elevation of an airplane constructed in accordance with my invention and employing a wing structure shown in Figs. 1, 2, and 3.
Figure 5:
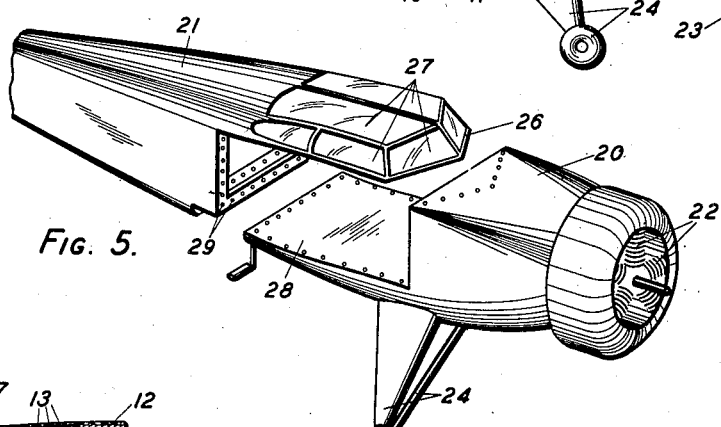
Fig. 5 is an exploded view of the fuselage portion of the airplane shown in Fig. 4, the wing structure being removed and parts being broken away.
Figure 6:
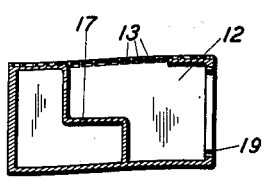
Fig. 6 is a sectional view through a cabin or cockpit portion of a wing structure taken substantially on broken line 6—6 of Fig. 7.

In both wing structures herein disclosed suitable flanges 19 having holes 29 therein are provided in connection with the cabin compartments 12 to facilitate assembly of the wing structure with forward and rear fuselage sections 20 and 21 respectively, of a form shown in Figs. 4 and 5.

The forward fuselage section 20 carries the usual motor 22, propeller 23 and landing gear 24. The rear fuselage section 21 carries suitable guide and control means 25.

The two fuselage sections 20 and 21 are shaped to fit over the cabin compartment of the wing structure and are adapted to be secured to the wing structure and to each other by suitable bolts or rivets inserted in holes 29 shown in the wing and fuselage portions.

One of the fuselage sections, such as the rear section 21, is provided with an upper cabin portion 26. This upper cabin portion 26 is positioned over the cabin compartment 12 of the wing structure shown in Fig. 7, when the several parts are assembled, and cooperates with the cabin compartment 12 to form a closed cabin.

If non-transparent material is used in the molding of the fuselage then suitable transparent windows 27 are provided in the upper cabin compartment 26. If, however, a plastic material is used for molding the fuselage such plastic material may be transparent and visibility thus provided for.

One plastic molding material suitable for molding the wing structure and fuselage herein disclosed is known as "Tenite." It may be obtained in transparent form or in various different colors. Other suitable plastic molding materials are readily obtainable on the market.

The use of transparent molding material in the construction of this airplane has the advantage of affording visibility to all parts of the airplane. It also has another advantage for military use in that an airplane constructed of transparent material is less visible and more difficult to see in the air.

It will be noted that the upper cabin portion 26 overlaps and is secured to the front fuselage section 20 while a portion 28 of the front fuselage section 20 extends rearwardly underneath the cabin compartment 12 of the wing section and fits within a notch in the rear fuselage section 21 and is secured to the rear section 21.

Having described my invention, what I claim as new and desire to secure by Letters Patent is:

1. In an airplane, a wing structure of one piece molded construction comprising a medially disposed cabin portion, and upper and lower plane members extending in opposite directions from said cabin portion, said upper and lower plane members converging toward their outer ends and being united at their tip portions.

2. In an airplane, a molded wing structure of one piece construction from tip to tip comprising a medially disposed cabin portion and upper and lower plane members extending in opposite directions from said cabin portion and converging toward their outer ends and being united at their tip portions, and a fuselage connected with the cabin portion of said wing structure.

3. In an airplane, a molded wing structure of one piece construction from tip to tip comprising a medially disposed cabin portion and upper and lower plane members extending in opposite directions from said cabin portion and converging toward their outer ends and being united at their tip portions, and a molded fuselage composed of a plurality of sections recessed to fit over the cabin portion of said wing structure and secured to said wing structure.

4. In an airplane, a molded wing structure of one piece construction from tip to tip comprising a medially disposed cabin portion, upper and lower plane members extending in opposite directions from said cabin portion and converging toward their outer ends and being united at their tip portions, and a plurality of vertically disposed flat members positioned at right angles to the length of said wing structure connecting said upper and lower plane members.

5. In an airplane, a molded wing structure of one piece construction from tip to tip comprising a medially disposed cabin portion and upper and lower plane members extending in opposite directions from said cabin portion and converging toward their ends and being united at their tip portions, and a fuselage comprising two parts recessed to fit over the cabin portion of said wing structure and secured to said wing structure, one of said parts having a recessed upper cabin portion cooperating with said cabin portion in said wing structure to complete an enclosed cabin.

6. In an airplane, a wing structure of molded construction comprising a medially disposed cabin portion, two upper plane members extending in opposite directions from the upper part of said cabin portion, said upper plane members being substantially straight longitudinally considered and being thicker at their inner ends and thinner at their outer ends and having longitudinally extending tapered openings cored therein, the downward incline of said upper plane members providing clearance for the withdrawal of cores from said openings after said wing structure has been molded, and lower plane members extending outwardly from said cabin portion below said upper plane members and secured to said upper plane members.

7. In an airplane, a wing structure of one piece molded construction comprising a medially disposed cabin portion, upper and lower plane members extending in opposite directions from said cabin portion, said plane members being spaced a substantial distance apart at the location of the cabin portion and converging toward their outer ends and being connected with each other, and reinforcing means in said lower plane member.

8. In an airplane, a molded wing structure comprising a relatively deep central portion, upper and lower plane members extending outwardly from the upper and lower portions respectively of said central portion and converging toward each other and united at their outer end portions to form substantially triangular truss structures and reinforcing means in said lower plane members, said lower plane members constituting tension members in said triangular truss structure to resist upwardly directed forces.

FRANK ELLISON BEST.